US005320902A

United States Patent [19]

Malhotra et al.

[11] Patent Number: 5,320,902

[45] Date of Patent: Jun. 14, 1994

[54] RECORDING SHEETS CONTAINING MONOAMMONIUM COMPOUNDS

[75] Inventors: Shadi L. Malhotra, Mississauga; Brent S. Bryant, Milton; Doris K. Weiss, Etobicoke, all of Canada

[73] Assignee: Xerox Corporation, Stamford, Conn.

[21] Appl. No.: 34,445

[22] Filed: Mar. 19, 1993

Related U.S. Application Data

[63] Continuation-in-part of Ser. No. 861,668, Apr. 1, 1992, Pat. No. 5,212,008.

[51] Int. Cl.[5] ........................ B32B 33/00; B41M 5/00

[52] U.S. Cl. .................................... 428/342; 428/195; 428/211; 428/411.1; 428/537.5; 428/688

[58] Field of Search ............... 428/342, 195, 207, 211, 428/331, 341, 342, 411.1, 913, 904, 537.5, 688; 346/135.1

[56] References Cited

U.S. PATENT DOCUMENTS 4,446,174 5/1984 Maekawa et al. .................... 427/261
4,547,405 10/1985 Bedell et al. ......................... 427/256
4,554,181 11/1985 Cousin et al. ........................ 427/261
4,576,867 3/1986 Miyamoto ............................ 428/342
4,740,420 4/1988 Akutsu et al. ........................ 428/341
4,781,985 1/1988 Desjarlais ............................. 428/421
4,783,376 11/1988 Sakai et al. .......................... 428/511
4,830,911 5/1989 Kojima et al. ........................ 428/342
4,877,680 10/1989 Sakaki et al. ........................ 428/332

FOREIGN PATENT DOCUMENTS 0439363 3/1993 European Pat. Off. .

*Primary Examiner*—Patrick J. Ryan
*Assistant Examiner*—William A. Krynski
*Attorney, Agent, or Firm*—Judith L. Byorick

[57] ABSTRACT

Disclosed is a recording sheet which consists essentially of a substrate and, in contact with the substrate, a monoammonium compound of the formula:

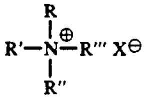

wherein R is an alkyl group, X is selected from the group consisting of fluoride, chloride, bromide, iodide, and astatide, and R', R'', and R''' are each independently selected from the group consisting of alkyl groups, substituted alkyl groups, aryl groups, substituted aryl groups, arylalkyl groups, and substituted arylalkyl groups, wherein R, R', R'' and R''' are either the same as or different from each other; and mixtures thereof; an optional binder component; and an optional filler component.

12 Claims, No Drawings

RECORDING SHEETS CONTAINING MONOAMMONIUM COMPOUNDS

This application is a continuation-in-part of copending application U.S. Ser. No. 07/861,668, filed Apr. 1, 1992 now U.S. Pat. No. 5,212,000, entitled "Coated Recording Sheets", the disclosure of which is totally incorporated herein by reference.

BACKGROUND OF THE INVENTION

The present invention is directed to recording sheets, such as transparency materials, filled plastics, papers, and the like. More specifically, the present invention is directed to recording sheets particularly suitable for use in ink jet printing processes. One embodiment of the present invention is directed to a recording sheet which consists essentially of a substrate and, in contact with the substrate, a monoammonium compound of the formula:

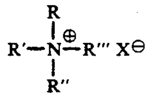

wherein R is an alkyl group, X is selected from the group consisting of fluoride, chloride, bromide, iodide, and astatide, and R', R'', and R''' are each independently selected from the group consisting of alkyl groups, substituted alkyl groups, aryl groups, substituted aryl groups, arylalkyl groups, and substituted arylalkyl groups; and mixtures thereof; an optional binder component; and an optional filler component.

Recording sheets suitable for use in ink jet printing are known. For example, U.S. Pat. No. 4,740,420 (Akutsu et al.) discloses a recording medium for ink jet printing comprising a support material containing at least in the surface portion thereof a water soluble metal salt with the ion valence of the metal thereof being 2 to 4 and a cationic organic material. The cationic organic materials include salts of alkylamines, quaternary ammonium salts, polyamines, and basic latexes. Specific examples of the salts of alkylamines include decylammonium acetate, undecylammonium acetate, dodecylammonium acetate, tridecylammonium acetate, tetradecylammonium acetate, pentadecylammonium acetate, hexadecylammonium acetate, heptadecylammonium acetate, octadecylammonium acetate, nonadecylammonium acetate, eicosylammonium acetate, decylammonium chloride, undecylammonium chloride, dodecylammonium chloride, tridecylammonium chloride, tetradecylammonium chloride, pentadecylammonium chloride, hexadecylammonium chloride, heptadecylammonium chloride, octadecylammonium chloride, nonadecylammonium chloride, and eicosylammonium chloride. Specific examples of the quaternary ammonium salts include lauryltrimethylammonium bromide, lauryltrimethylammonium chloride, cetyltrimethylammonium bromide, cetyltrimethylammonium chloride, octaisoquinolinium bromide, octaisoquinolinium chloride, hexadecyltrimethylammonium bromide, and hexadecyltrimethylammonium chloride. Specific examples of polyamines include polyamide polyamine, polyoxyethylene alkylamine, polyethylamine epichlorohydrin, polydimethylaminoethyl methacrylate, and polyalkylammonium. Specific examples of basic latexes include polyamine latex and alkylammonium latex.

U.S. Pat. No. 4,576,867 (Miyamoto) discloses an ink jet recording paper with improved water resistance and sunlight fastness of the image formed on the paper wherein the recording paper has attached to its surface a cationic resin of the formula

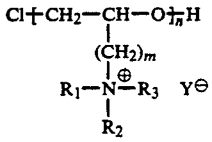

wherein $R_1$, $R_2$, and $R_3$ represent alkyl groups, m represents a number of 1 to 7, and n represents a number of 2 to 20, and Y represents an acid residue.

U.S. Pat. No. 4,446,174 (Maekawa et al.) discloses an ink jet recording method for producing a recorded image on an image receiving sheet with a jet of aqueous ink, wherein an ink jet is projected onto an image receiving sheet comprising a surface layer containing a pigment, and wherein the surface layer is capable of absorbing a coloring component in the aqueous ink.

U.S. Pat. No. 4,830,911 (Kojima et al.) discloses a recording sheet for ink jet printers which gives an image by the use of an aqueous ink containing a water-soluble dye, coated or impregnated with either of or a mixture of two kinds of water soluble polymers, one whose polymeric unit is alkylquaternaryammonium (meth)acrylate and the other whose polymer unit is alkylquaternaryammonium (meth)acrylamide, wherein the water soluble polymers contain not less than 50 mol percent of a monomer represented by the formula

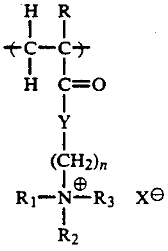

where R represents hydrogen or methyl group, n is an interger from 1 to 3 inclusive, $R_1$, $R_2$, and $R_3$ represent hydrogen or the same or different aliphatic alkyl group with 1 to 4 carbon atoms, X represents an anion such as a halogen ion, sulfate ion, alkyl sulfate ion, alkyl sulfonate ion, aryl sulfonate ion, and acetate ion, and Y represents oxygen or imino group.

U.S. Pat. No. 4,554,181 (Cousin et al.) discloses an ink jet recording sheet having a recording surface which includes a combination of a water soluble polyvalent metal salt and a cationic polymer, the polymer having cationic groups which are available in the recording surface for insolubilizing an anionic dye.

U.S. Pat. No. 4,877,680 (Sakaki et al.) discloses a recording medium comprising a substrate and a nonporous ink receiving layer. The ink receiving layer contains a water-insoluble polymer containing a cationic resin. The recording medium may be employed for recording by attaching droplets of a recording liquid thereon.

European Patent Publication 0 439 363 A1, published Jul. 31, 1991, corresponding to copending application U.S. Ser. No. 07/469,985, filed Jan. 25, 1990, the disclosure of which is totally incorporated herein by reference, discloses a paper which comprises a supporting substrate with a coating comprising (a) a desizing component selected from the group consisting of (1) hydrophilic poly(dialkylsiloxanes); (2) poly(alkylene glycol); (3)poly(propylene oxide)-poly(ethylene oxide) copolymers; (4) fatty ester modified compounds of phosphate, sorbitan, glycerol, poly(ethylene glycol), sulfosuccinic acid, sulfonic acid and alkyl amine; (5) poly(oxyalkylene) modified compounds of sorbitan esters, fatty amines, alkanol amides, castor oil, fatty acids and fatty alcohols; (6) quaternary alkosulfate compounds; (7) fatty imidazolines; and mixtures thereof, and (b) a hydrophilic binder polymer. The binder polymer may be a quaternary ammonium copolymer such as Mirapol WT, Mirapol AD-1, Mirapol AZ-1, Mirapol A-15, Mirapol-9, Merquat-100, or Merquat-550, available from Miranol Incorporated.

Copending application U.S. Ser. No. 07/861,670, filed Apr. 1, 1992, the disclosure of which is totally incorporated herein by reference, discloses a recording sheet which comprises a substrate and coating consisting essentially of (1) quaternary ammonium polymers selected from the group consisting of (a) polymers of Formula I

I

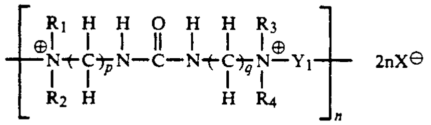

wherein n is an integer of from 1 to about 200, $R_1$, $R_2$, $R_3$, and $R_4$ are each independently selected from the group consisting of alkyl groups, hydroxyalkyl groups, and polyoxyalkylene groups, p is an integer of from 1 to about 10, q is an integer of from 1 to about 10, X is an anion, and $Y_1$ is selected from the group consisting of $—CH_2CH_2OCH_2CH_2—$, $—CH_2CH_2OCH_2CH_2OCH_2CH_2—$, $—(CH_2)_k—$, wherein k is an integer of from about 2 to about 10, and $—CH_2CH(OH)CH_2—$; (b) polymers of Formula II

II

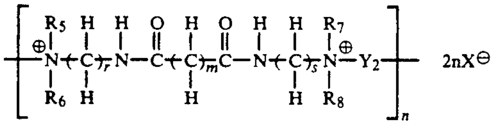

wherein n is an integer of from 1 to about 200, $R_5$, $R_6$, $R_7$, and $R_8$ are each independently selected from the group consisting of alkyl groups, hydroxyalkyl groups, and polyoxyalkylene groups, m is an integer of from 0 to about 40, r is an integer of from 1 to about 10, s is an integer of from 1 to about 10, X is an anion, and $Y_2$ is selected from the group consisting of $—CH_2CH_2OCH_2CH_2—$, $—CH_2CH_2OCH_2CH_2OCH_2CH_2—$, $—(CH_2)_k—$, wherein k is an integer of from about 2 to about 10, and $—CH_2CH(OH)CH_2—$; (c) copolymers of Formula III

III

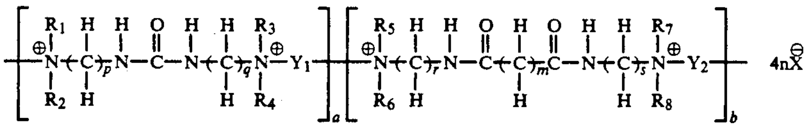

wherein a and b are each integers wherein the sum of a+b is from about 2 to about 200, $R_1$, $R_2$, $R_3$, $R_4$, $R_5$, $R_6$, $R_7$, and $R_8$ are each independently selected from the group consisting of alkyl groups, hydroxyalkyl groups, and polyoxyalkylene groups, p is an integer of from 1 to about 10, q is an integer of from 1 to about 10, X is an anion, and $Y_1$ and $Y_2$ are each independently selected from the group consisting of $—CH_2CH_2OCH_2CH_2—$, $—CH_2CH_2OCH_2CH_2OCH_2CH_2—$, $—(CH_2)_k—$, wherein k is an integer of from about 2 to about 10, and $—CH_2CH(OH)CH_2—$; (d) mixtures of polymers of Formula I and polymers of Formula II; (e) mixtures of polymers of Formula I and copolymers of Formula III; (f) mixtures of polymers of Formula II and copolymers of Formula III; and (g) mixture of polymers of Formula I, polymers of Formula II, and copolymers of Formula III; (2) an optional binder polymer; and (3) an optional filler.

Copending application U.S. Ser. No. 07/861,668, filed Apr. 1, 1992, the disclosure of which is totally incorporated herein by reference, discloses a recording sheet which comprises a substrate; a first coating in contact with the substrate which comprises a crosslinking agent selected from the group consisting of hexamethoxymethyl melamine, methylated melamine-formaldehyde, methylated urea-formaldehyde, cationic urea-formaldehyde, cationic polyamine-epichlorohydrin, glyoxal-urea resin, poly (aziridine), poly (acrylamide), poly (N,N-dimethyl acrylamide), acrylamideacrylic acid copolymer, poly (2-acrylamido-2-methyl propane sulfonic acid), poly (N,N-dimethyl-3,5-dimethylene piperidinium chloride), poly (methylene-guanidine) hydrochloride, poly (ethylene imine) poly (ethylene imine) epichlorohydrin, poly (ethylene imine) ethoxylated, glutaraldehyde, and mixtures thereof; a catalyst; and a polymeric material capable of being crosslinked by the crosslinking agent and selected from the group consisting of polysaccharides having at least one hydroxy group, polysaccharides having at least one carboxy group, polysaccharides having at least one sulfate group, polysaccharides having at least one amine or amino group, polysaccharide gums, poly (alkylene oxides), vinyl polymers, and mixtures thereof; and a second coating in contact with the first coating which comprises a binder and a material selected from the group consisting of fatty imidazolines, ethosulfate quaternary compounds, dialkyl dimethyl methosulfate quaternary compounds, alkoxylated di-fatty quaternary compounds, amine oxides, amine ethoxylates, imidazoline quaternary compounds, alkyl benzyl dimethyl quaternary compounds, poly (epiamines), and mixtures thereof.

While known compositions and processes are suitable for their intended purposes, a need remains for improved recording sheets. In addition, there is a need for improved recording sheets suitable for use in ink jet printing processes. Further, a need remains for recording sheets for ink jet printing with a high degree of waterfastness. Additionally, there is a need for paper recording sheets for ink jet printing with reduced showthrough of the images on the side of the paper opposite to that printed. There is also a need for recording sheets for ink jet printing with enhanced optical density.

SUMMARY OF THE INVENTION

It is an object of the present invention to provide recording sheets with the above noted advantages.

It is another object of the present invention to provide recording sheets suitable for use in ink jet printing processes.

It is yet another object of the present invention to provide recording sheets recording sheets for ink jet printing with a high degree of waterfastness.

It is still another object of the present invention to provide paper recording sheets for ink jet printing with reduced showthrough of the images on the side of the paper opposite to that printed.

Another object of the present invention is to provide recording sheets for ink jet printing with enhanced optical density.

These and other objects of the present invention (or specific embodiments thereof) can be achieved by providing a recording sheet which consists essentially of a substrate and, in contact with the substrate, a monoammonium compound of the formula:

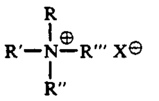

wherein R is an alkyl group, X is selected from the group consisting of fluoride, chloride, bromide, iodide, and astatide, and R′, R″, and R‴ are each independently selected from the group consisting of alkyl groups, substituted alkyl groups, aryl groups, substituted aryl groups, arylalkyl groups, and substituted arylalkyl groups; and mixtures thereof; an optional binder component; and an optional filler component.

DETAILED DESCRIPTION OF THE INVENTION

The recording sheets of the present invention comprise a substrate and at least two coating layers on one or both surfaces of the substrate. Any suitable substrate can be employed. Examples include transparent materials, such as polyester, including Mylar TM, available from E. I. Du Pont de Nemours & Company, Melinex TM, available from Imperial Chemicals, Inc., Celanar TM, available from Celanese Corporation, polycarbonates such as Lexan TM, available from General Electric Company, polysulfones, such as those available from Union Carbide Corporation, polyether sulfones, such as those prepared from 4,4′-diphenyl ether, such as Udel TM, available from Union Carbide Corporation, those prepared from disulfonyl chloride, such as Victrex TM, available from ICI America Incorporated, those prepared from biphenylene, such as Astrel TM, available from 3M Company, poly (arylene sulfones), such as those prepared from crosslinked poly(arylene ether ketone sulfones), cellulose triacetate, polyvinylchloride cellophane, polyvinyl fluoride, polyimides, and the like, with polyester such as Mylar TM being preferred in view of its availability and relatively low cost. The substrate can also be opaque, including opaque plastics, such as Teslin TM, available from PPG Industries, and filled polymers, such as Melinex ®, available from ICI. Filled plastics can also be employed as the substrate, particularly when it is desired to make a "never-tear paper" recording sheet. Paper is also suitable, including plain papers such as Xerox ® 4024, diazo papers, or the like.

In one embodiment of the present invention, the substrate comprises sized blends of hardwood kraft and softwood kraft fibers containing from about 10 to 90 percent by weight soft wood and from about 10 to about 90 percent by weight hardwood. Examples of hardwood include Seagull W dry bleached hardwood kraft, present in one embodiment in an amount of about 70 percent by weight. Examples of softwood include La Tuque dry bleached softwood kraft, present in one embodiment in an amount of about 30 percent by weight. These substrates can also contain fillers and pigments in any effective amounts, typically from about 1 to about 60 percent by weight, such as clay (available from Georgia Kaolin Company, Astro-fil 90 clay, Engelhard Ansilex clay), titanium dioxide (available from Tioxide Company-Anatase grade AHR), calcium silicate CH-427-97-8, XP-974 (J. M. Huber Corporation), and the like. The sized substrates can also contain sizing chemicals in any effective amount, typically from about 0.25 percent to about 25 percent by weight of pulp, such as acidic sizing, including Mon size (available from Monsanto Company), alkaline sizing such as Hercon-76 (available from Hercules Company), Alum (available from Allied Chemicals as Iron free alum), retention aid (available from Allied Colloids as Percol 292), and the like. The preferred internal sizing degree of papers selected for the present invention, including commercially available papers, varies from about 0.4 to about 5,000 seconds, and papers in the sizing range of from about 0.4 to about 300 seconds are more preferred, primarily to decrease costs. Preferably, the selected substrate is porous, and the porosity value of the selected substrate preferably varies from about 100 to about 1,260 milliliters per minute and preferably from about 50 to about 600 milliliters per minute to enhance the effectiveness of the recording sheet in ink jet processes. Preferred basis weights for the substrate are from about 40 to about 400 grams per square meter, although the basis weight can be outside of this range.

Illustrative examples of commercially available internally and externally (surface) sized substrates suitable for the present invention include Diazo papers, offset papers, such as Great Lakes offset, recycled papers, such as Conservatree, office papers, such as Automimeo, Eddy liquid toner paper and copy papers available from companies such as Nekoosa, Champion, Wiggins Teape, Kymmene, Modo, Domtar, Veitsiluoto and Sanyo, and the like, with Xerox ® 4024 TM papers and sized calcium silicate-clay filled papers being particularly preferred in view of their availability, reliability, and low print through. Pigmented filled plastics, such as Teslin (available from PPG industries), are also preferred as supporting substrates.

The substrate can be of any effective thickness. Typical thicknesses for the substrate are from about 50 to about 500 microns, and preferably from about 100 to about 125 microns, although the thickness can be outside these ranges.

In contact with the substrate of the present invention is one or more monoammonium compounds. Suitable monoammonium compounds include those of the formula

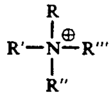

wherein R is an alkyl group, preferably with from 1 to about 25 carbon atoms, X is selected from the group consisting of fluoride, chloride, bromide, iodide, and astatide, and R', R'', and R''' are each independently selected from the group consisting of alkyl groups, substituted alkyl groups, aryl groups, substituted aryl groups, arylalkyl groups, and substituted arylalkyl groups, wherein R, R', R'' and R''' can be either the same as or different from each other.

Specific examples of suitable R groups include alkyl groups, preferably with from 1 to about 25 carbon atoms, such as methyl, ethyl, n-propyl, isopropyl, n-butyl, isobutyl, hexyl, and the like, and including cyclic alkyl groups, such as cyclopropyl, cyclohexyl, and the like, and including unsaturated alkyl groups, such as vinyl ($H_2C{=}CH{-}$), allyl ($H_2C{=}CH{-}CH_2{-}$), propynyl ($HC{\equiv}C{-}CH_2{-}$), and the like. Specific examples of suitable R', R'', and R''' groups include alkyl groups, preferably with from 1 to about 25 carbon atoms, such as methyl, ethyl, n-propyl, isopropyl, n-butyl, isobutyl, hexyl, and the like, and including cyclic alkyl groups, such as cyclopropyl, cyclohexyl, and the like, and including unsaturated alkyl groups, such as vinyl ($H_2C{=}CH{-}$), allyl ($H_2C{=}CH{-}CH_2{-}$), propynyl ($HC{\equiv}C{-}CH_2{-}$), and the like, substituted alkyl groups, preferably with from 1 to about 25 carbon atoms, aryl groups, preferably with from 6 to about 25 carbon atoms, such as phenyl, naphthyl, and the like, substituted aryl groups, preferably with from 6 to about 25 carbon atoms, arylalkyl groups, preferably with from 7 to about 25 carbon atoms, such as benzyl, substituted arylakyl groups, preferably with from 7 to about 25 carbon atoms, with examples of substituents including halogen atoms, amine groups, carboxylic acid groups, amide groups, hydroxy groups, nitro groups, ether and alkoxy groups, ester groups, silyl groups, aldehyde groups, ketone groups, and the like.

When R, R', R'', and R''' are each the same alkyl group, the monoammonium compound is of the formula

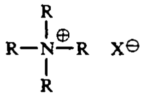
II wherein R is an alkyl group, preferably with from 1 to about 25 carbon atoms, X is selected from the group consisting of fluoride, chloride, bromide, iodide, and astatide, and all four R groups are the same.

When R, R'', and R''' are each the same alkyl group, the monoammonium compound is of the formula

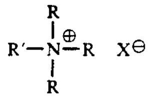
III wherein R is an alkyl group, preferably with from 1 to about 25 carbon atoms, X is selected from the group consisting of fluoride, chloride, bromide, iodide, and astatide, R' is selected from the group consisting of alkyl groups, substituted alkyl groups, aryl groups, substituted aryl groups, arylalkyl groups, and substituted arylalkyl groups, wherein all three R groups are the same and R' is not the same as R.

When R and R''' are each the same alkyl group, the monoammonium compound is of the formula

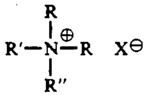
IV wherein R is an alkyl group, preferably with from 1 to about 25 carbon atoms, X is selected from the group consisting of fluoride, chloride, bromide, iodide, and astatide, R' is selected from the group consisting of alkyl groups, substituted alkyl groups, aryl groups, substituted aryl groups, arylalkyl groups, and substituted arylalkyl groups, R'' is selected from the group consisting of alkyl groups, substituted alkyl groups, aryl groups, substituted aryl groups, arylalkyl groups, and substituted arylalkyl groups, wherein both R groups are the same, R' is not the same as R, R'' is not the same as R, and R' and R'' are either the same as or different from each other.

Specific examples of materials of Formula I include tricapryl methyl ammonium chloride (Aliquat 336 Aldrich 20,561-3), tridodecyl methyl ammonium chloride (Fluka 91661), tridecyloxypropyl dihydroxy ethyl methyl ammonium chloride (Tomah Q-17-2, Tomah), N-tetradecyl dimethyl-naphthyl methyl ammonium chloride (BTC 1100, Onyx), octadecyl diethanol methyl ammonium chloride (M-Quat 32, Mazer Chemicals), octadecyl dihydroxyethyl methyl ammonium chloride (Tomah Q-18-2, Tomah), dihydrogenated tallow benzyl methyl ammonium chloride (Variquat B 343, Sherex Chemicals), and the like.

Specific examples of materials of Formula II include tetramethyl ammonium bromide (available from Aldrich Chemical Co., 19,575-8), tetramethyl ammonium chloride (Aldrich T1,952-6), tetramethyl ammonium iodide (Aldrich 23,594-6), tetraethyl ammonium bromide (Aldrich 24,105-9), tetraethyl ammonium chloride (Aldrich 11304-2), tetraethyl ammonium iodide (Aldrich 23,593-8), tetrapropyl ammonium bromide (Aldrich 22,556-8), tetrapropyl ammonium iodide (Aldrich 23,595-4), tetrabutyl ammonium bromide (Aldrich 19,311-9), tetrabutyl ammonium chloride (Aldrich 28,888-8), tetrabutyl ammonium iodide (Aldrich 14,077-5), tetrapentyl ammonium bromide (Aldrich 24,197-0), tetrapentyl ammonium chloride (Aldrich 25,896-2), tetrahexyl ammonium chloride (Aldrich 26,383-4), tetrahexyl ammonium bromide (Aldrich 25,281-6), tetrahexyl ammonium iodide (Fluka 87307), tetraheptyl ammonium bromide (Aldrich 23,784-1), tetraoctyl ammonium bromide (Aldrich 29,413-6), tetradecyl ammonium bromide (Fluka 87582), tetradodecyl ammonium bromide (Fluka 87249), tetrahexadecyl ammonium bromide (Fluka 87298), tetraoctadecyl ammonium bromide (Aldrich 35,873-8), and the like.

Specific examples of materials of Formula III include 2-aminoethyl trimethyl ammonium chloride hydrochloride (Aldrich 28,455-6), 2-bromoethyl trimethyl ammonium bromide (Aldrich 11,719-6), 2-chloroethyl trimethyl ammonium chloride (Aldrich 23,443-5), 3-carboxypropyl trimethyl ammonium chloride (Aldrich 23,443-5), [3-(methacryloyl amino) propyl] trimethyl ammonium chloride (Aldrich 28,065-8), of the formula

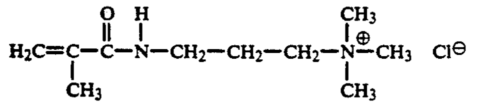

phenyl trimethyl ammonium bromide (Aldrich 13,532-1), phenyl trimethyl ammonium chloride (Aldrich 19,916-8), phenyl trimethyl ammonium iodide (Aldrich 13,914-9), benzyl trimethyl ammonium chloride (Aldrich 22,557-6, Hipochem Migrator J from High Point Chemical Corporation, Variquat B200 from Sherex Chemicals), benzyl trimethyl ammonium bromide (Aldrich 14,711-7), 4-nitrobenzyl trimethyl ammonium chloride (Aldrich 29,369-5), [2-(4-nitrophenyl) allyl] trimethyl ammonium iodide (Aldrich 30,217-1), of the formula

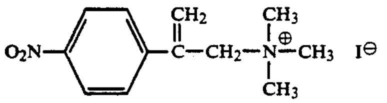

coco trimethyl ammonium chloride (Arquad C-33, C-33W, C-50 from Akzo Chemie, Noramium MC-50 from Diamond Shamrock, Jet Quat C-50 from Jetco Chemicals, Quartamin CPR from Kao Corporation), palmityl trimethyl ammonium chloride (Adogen 444 from Sherex Chemicals), myristyl trimethyl ammonium bromide (Aldrich 86,042-5) (Cetrimide BP Triple Crown America), oleyl trimethyl ammonium chloride (Noramium MO-50 from Diamond Shamrock), soya trimethyl ammonium chloride (Arquad S-20 Akzo Chemie, Jet Quat S-2C-50 Jetco Chemicals, Tomah Q-S from Tomah), tallow trimethyl ammonium chloride (Arquad T-50, T-27W Akzo Chemie, Jet Quat T-50 Jetco Chemicals, Quartamin TPR from Kao Corp, Radiaquat 6471 from Oleofina S. A., Adogen 471 from Sherex Chemicals, Querton BGCL50 from Kenobel), hydrogenated tallow trimethyl ammonium chloride (Noramium MSH-50 from Diamond Shamrock, Quartamin HTPR from Kao Corp, Adogen 441 from Sherex Chemicals), stearyl trimethyl ammonium chloride (Arquad 18-50 from Akzo Chemie), behenyl trimethyl ammonium chloride (Incroquat TMC/P, Croda Universal Inc.), guar hydroxypropyl trimethyl ammonium chloride (C-261 from Henkel), benzyl triethyl ammonium chloride (Aldrich 14,655-2), benzyl triethyl ammonium bromide (Aldrich 14,712), butyl tripropyl ammonium bromide (Aldrich 28038-0), methyl tributyl ammonium chloride (Aldrich 25,516-5), methyl tributyl ammonium bromide (Fluka 90802), methyl tributyl ammonium iodide (Fluka 90804), benzyl tributyl ammonium chloride (Aldrich 19,377-1), benzyl tributyl ammonium bromide (Aldrich 24,378-7), benzyl tributyl ammonium iodide (Aldrich 29,301-6), heptyl tributyl ammonium bromide (Fluka 90797), and the like.

Specific examples of materials of Formula IV include N,N-dimethyl methylene ammonium chloride (Aldrich 32,449-3), N,N-dimethyl methylene ammonium iodide (Aldrich 21,491-4), chloromethylene dimethyl ammonium chloride (Aldrich 28,090-9), and dichloromethylene dimethyl ammonium chloride (Aldrich 16,287-6), dimethyl amino methylene amino methylene dimethyl ammonium chloride (Golds Reagent Aldrich 28,907-8), of the formula

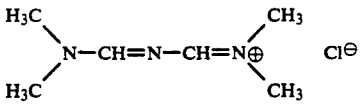

benzethonium chloride (Aldrich B470-8), of the structure

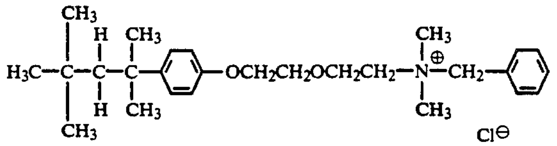

methyl benzethoniumchloride (Aldrich 28,659), of the structure

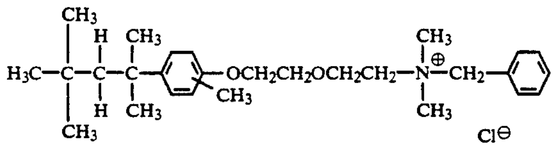

1-propanaminium 2,3-dihydroxy-N-dimethyl-N-[3(oxococoyl) amino-propyl]-chloride (Lexquat AMG-WC from Inolex Chemical Corporation), cetyl dimethyl ethyl ammonium bromide (Aldrich 22,899-0), octyl dodecyl dimethyl ammonium chloride (BTC812 from Onyx), dodecyl (2-hydroxy-1-methyl-2-phenyl-ethyl) dimethyl ammonium bromide (also called N-dodecyl N-methyl ephedrinium bromide, Aldrich 23,540-7), of the structure

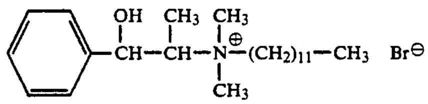

dodecyl dimethyl 2-phenoxyethyl ammonium bromide (domiphen bromide Aldrich 24,748-0), of the formula

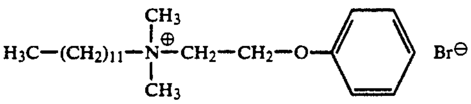

dodecanoyl-N-methylamino ethyl-(phenyl carbamyl methyl) dimethyl ammonium chloride (Desogen from Ciba Geigy PLC), 3-chloro-2-hydroxypropyl N,N,N-dimethyl dodecyl ammonium chloride, such as Quab 342 from Degussa, of the structure

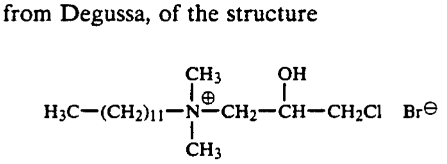

3-chloro-2-hydroxypropyl N,N,N-dimethyl octadecyl ammonium chloride, such as Quab 426 from Degussa, dodecyl benzyl dimethyl ammonium bromide (Aldrich 28,088-7), dodecyl benzyl dimethyl ammonium chloride (Loraquat B50 Dutton and Reinisch Ltd., Retarder N from Hart Chemicals), coco benzyl dimethyl ammonium chloride (Meripiquat K-8-2 from Kempen, Nissan cation $F_2$-10R, $F_2$-20R, $F_2$-40E, $F_2$-50 from Nippon oils and Fats, Querton KKBCL from Lilachim), benzyl tetradecyl dimethyl ammonium chloride (Arquad DM 14B-90 from Akzo Chemie, Variquat 50ME, 80ME from Sherex Chemicals, Cyncal Hilton-Davis Chemicals, 29,279-6 Aldrich), benzyl cetyl dimethyl ammonium chloride (Querton 16BCL from Lilachim, Aldrich 22,900-8), benzyl octadecyl dimethyl ammonium chloride (also called benzyl stearyl dimethyl ammonium chloride, Arquad DM 18B-90 Akzo Chemie, Varisoft 6112 from Sherex Chemicals, Nissan Cation $S_2$-100 from Nippon Oils and Fats, Carosoft SDQ-25, SDQ-85 from Lonza Inc, 22,901-6 Aldrich), benzyl tallow dimethyl ammonium chloride (Kemamine BQ-9742C from Witco Chemicals and Noramium S-75 from Diamond Shamrock), benzyl hydrogenated tallow dimethyl ammonium chloride (Arquad DMHTB-75 from Akzo Chemie, Kemamine BQ-9702C from Witco Chemicals, Querton 441-BC, HBG BCL from Kenobel), benzyl behenyl dimethyl ammonium chloride (Incroquat behenyl BDQ/P from Croda Universal Inc., Kemamine Q-2802-C from Witco Chemicals), dioctyl dimethyl ammonium chloride (Querton 28CL from Lilachim), didecyl dimethyl ammonium chloride (Bio-Dac from Bio-Lab Inc., Querton 210 CL from Lilachim, Bardac 2250 from Lonza Inc., BTC 1010 from Onyx chemicals), didecyl dimethyl ammonium bromide (Aldrich 29,801-8), dicoco dimethyl ammonium chloride (Accoquat 2C-75, Armstrong Chemical Co. Ltd., Kemamine Q-6503C, Witco, Jet Quat 2C-75, Jetco Chemicals, M-Quat 2475, Mazer, Quartamine DCP, Kao Corp., Arquad 2C-75, Akzo Chemie, Radiaquat 6462, Oleofina S. A., Variquat K300, Sherex Chemicals, Adogen 462, Sherex Chemicals), dicetyl dimethyl ammonium chloride (Adogen 432CG, Sherex Chemicals), disoya dimethyl ammonium chloride (Arquad 2S-75 from Akzo Chemie), ditallow dimethyl ammonium chloride (Adogen 470, Sherex Chemicals), dihydrogenated tallow dimethyl ammonium chloride (Arquad 2HT-75, Akzo Chemie, Kemamine Q-9702C, Witco, Carsosoft V-90, V-100, Lonza Inc., Adogen 442, Sherex Chemicals, Varisoft 3262, Varisoft DHT, Sherex Chemicals, Radiaquat 6442, Oleofina S. A., Jet Quat 2HT-75, Jetco Chemicals, Accosoft 707, Stepan), dibehenyl/diarachidyl dimethyl ammonium chloride (Kemamine Q-1902C, 1302C from Witco Chemicals), soya amido propyl benzyl dimethyl ammonium chloride (Schercoquat, SOAB, Scher Chemicals), of the formula

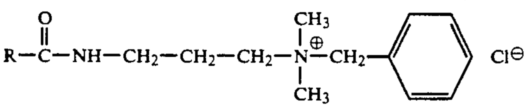

R = soya soya dicoco quaternary ammonium chloride (Jet Quat S-2C-50, Jetco Chemicals), gluconamidopropyl dimethyl-2-hydroxyethyl ammonium chloride (Quaternium 22, Ceraphyl 60, Van Dyk), of the structure

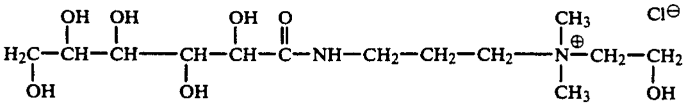

N-alkyl-N-N-dimethyl-N(dodecyl acetate) ammonium chloride, wherein alkyl has from 14 to 20 carbon atoms (Schercoquat ALA, Scher Chemicals), mink amidopropyl dimethyl-2-hydroxyethyl ammonium chloride (Quaternium 26, Ceraphyl 65, Van Dyk), of the structure

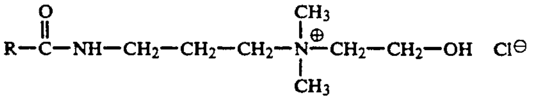

R = mink

N-rapeseed-(3-amidopropyl)-N-N-dimethyl-N-(2,3 epoxy propyl) ammonium chloride (Schercoquat ROEP, Scher Chemicals), of the structure

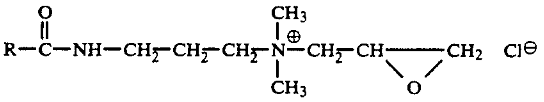

R = rapeseed

N-stearyl-(3-amido propyl)-N-benzyl dimethyl ammonium chloride (Schercoquat SAB, Scher Chemicals), rapeseed amido propyl benzyl dimethyl ammonium chloride, (Schercoquat ROAB, Scher Chemicals), rapeseed amido propyl ethyl dimethyl ammonium chloride (Schercoquat ROAS, Scher Chemicals), of the structure

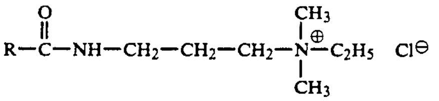

R = rapeseed cocamidopropyl polyethylene glycol dimethyl ammonium chloride phosphate (Monaquat P-TC from Mona Industries), and the like.

Mixtures of compounds of one or more of the above formulae are also suitable for the present invention. For example, blends of compounds of Formula III and compounds of Formula IV, such as a 1:1 blend of oleyl trimethyl ammonium chloride and dicoco dimethyl ammonium chloride (Arquad S-2C-50 from Akzo Chemie), a 1:1 blend of trimethyl tallow ammonium chloride and dimethyl dicoco ammonium chloride (Arquad T-2C-50, from Akzo Chemie and Adogen R-6 from Sherex Chemicals) are suitable, as well as any other combination of two or more of the above compounds.

The monoammonium compound is present in any effective amount relative to the substrate. Typically, the monoammonium compound is present in an amount of from about 0.5 to about 25 percent by weight of the substrate, preferably from about 2 to about 10 percent by weight of the substrate, although the amount can be outside these ranges. The amount can also be expressed in terms of the weight of monoammonium compound per unit area of substrate. Typically, the monoammonium compound is present in an amount of from about 0.5 to about 25 grams per square meter of the substrate surface to which it is applied, although the amount can be outside these ranges.

When the monoammonium compound is applied to the substrate as a coating, the coatings employed for the recording sheets of the present invention can include an optional binder in addition to the ammonium compound. Examples of suitable binder polymers include (a) hydrophilic polysaccharides and their modifications, such as (1) starch (such as starch SLS-280, available from St. Lawrence starch), (2) cationic starch (such as Cato-72, available from National Starch), (3) hydroxyalkylstarch, wherein alkyl has at least one carbon atom and wherein the number of carbon atoms is such that the material is water soluble, preferably from about 1 to about 20 carbon atoms, and more preferably from about 1 to about 10 carbon atoms, such as methyl, ethyl, propyl, butyl, or the like (such as hydroxypropyl starch (#02382, available from Poly Sciences Inc.) and hydroxyethyl starch (#06733, available from Poly Sciences Inc.)), (4) gelatin (such as Calfskin gelatin #00639, available from Poly Sciences Inc.), (5) alkyl celluloses and aryl celluloses, wherein alkyl has at least one carbon atom and wherein the number of carbon atoms is such that the material is water soluble, preferably from 1 to about 20 carbon atoms, more preferably from 1 to about 10 carbon atoms, and even more preferably from 1 to about 7 carbon atoms, such as methyl, ethyl, propyl, butyl, pentyl, hexyl, benzyl, and the like (such as methyl cellulose (Methocel AM 4, available from Dow Chemical Company)), and wherein aryl has at least 6 carbon atoms and wherein the number of carbon atoms is such that the material is water soluble, preferably from 6 to about 20 carbon atoms, more preferably from 6 to about 10 carbon atoms, and even more preferably about 6 carbon atoms, such as phenyl, (6) hydroxy alkyl celluloses, wherein alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl, pentyl, hexyl, benzyl, or the like (such as hydroxyethyl cellulose (Natrosol 250 LR, available from Hercules Chemical Company), and hydroxypropyl cellulose (Klucel Type E, available from Hercules Chemical Company)), (7) alkyl hydroxy alkyl celluloses, wherein each alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl, pentyl, hexyl, benzyl, or the like (such as ethyl hydroxyethyl cellulose (Bermocoll, available from Berol Kem. A. B. Sweden)), (8) hydroxy alkyl celluloses, wherein each alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like (such as hydroxyethyl methyl cellulose (HEM, available from British Celanese Ltd., also available as Tylose MH, MHK from Kalle A. G.), hydroxypropyl methyl cellulose (Methocel K35LV, available from Dow Chemical Company), and hydroxy butylmethyl cellulose (such as HBMC, available from Dow Chemical Company)), (9) dihydroxyalkyl cellulose, wherein alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like (such as dihydroxypropyl cellulose, which can be prepared by the reaction of 3-chloro-1,2-propane with alkali cellulose), (10) hydroxy alkyl hydroxy alkyl cellulose, wherein each alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like (such as hydroxypropyl hydroxyethyl cellulose, available from Aqualon Company), (11) halodeoxycellulose, wherein halo represents a halogen atom (such as chlorodeoxycellulose, which can be prepared by the reaction of cellulose with sulfuryl chloride in pyridine at 25° C.), (12) amino deoxycellulose (which can be prepared by the reaction of chlorodeoxy cellulose with 19 percent alcoholic solution of ammonia for 6 hours at 160° C.), (13) dialkylammonium halide hydroxy alkyl cellulose, wherein each alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like, and wherein halide represents a halogen atom (such as diethylammonium chloride hydroxy ethyl cellulose, available as Celquat H-100, L-200, National Starch and Chemical Company), (14) hydroxyalkyl trialkyl ammonium halide hydroxyalkyl cellulose, wherein each alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like, and wherein halide represents a halogen atom (such as hydroxypropyl trimethyl ammonium chloride hydroxyethyl cellulose, available from Union Carbide Company as Polymer JR), (15) dialkyl amino alkyl cellulose, wherein each alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like, (such as diethyl amino ethyl cellulose, available from Poly Sciences Inc. as DEAE cellulose #05178), (16) carboxyalkyl dextrans, wherein alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl, pentyl, hexyl, and the like, (such as carboxymethyl dextrans, available from Poly Sciences Inc. as #16058), (17) dialkyl aminoalkyl dextran, wherein each alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like (such as diethyl aminoethyl dextran, available from Poly Sciences Inc. as #5178), (18) amino dextran (available from Molecular Probes Inc), (19) carboxy alkyl cellulose salts, wherein alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like, and wherein the cation is any conventional cation, such as sodium, lithium, potassium, calcium, magnesium, or the like (such as sodium carboxymethyl cellulose CMC 7HOF, available from Hercules Chemical Company), (20) gum arabic (such as #G9752, available from Sigma Chemical Company), (21) carrageenan (such as #C1013 available from Sigma Chemical Company), (22) Karaya gum (such as #G0503, available from Sigma Chemical Company), (23) xanthan (such as Keltrol-T, available from Kelco division of Merck and Company), (24) chitosan (such as #C3646, available from Sigma Chemical Company), (25) carboxyalkyl hydroxyalkyl guar, wherein each alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like (such as carboxymethyl hydroxypropyl guar, available from Auqualon Company), (26) cationic guar (such as Celanese Jaguars C-14-S, C-15, C-17, available from Celanese Chemical Company), (27) n-carboxyalkyl chitin, wherein alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like, such as n-carboxymethyl chitin, (28) dialkyl ammonium hydrolyzed collagen protein, wherein alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like (such as dimethyl ammonium hydrolyzed collagen protein, available from Croda as Croquats), (29) agar-agar (such as that available from Pfaltz and Bauer Inc), (30) cellulose sulfate salts, wherein the cation is any conventional cation, such as sodium, lithium, potassium, calcium, magnesium, or the like (such as sodium cellulose sulfate #023 available from Scientific Polymer Products), and (31) carboxyalkylhydroxylalkyl cellulose salts, wherein each alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like, and wherein the cation is any conventional cation, such as sodium, lithium, potassium, calcium, magnesium, or the like (such as sodium carboxymethylhydroxyethyl cellulose CMHEC 43H and 37L available from Hercules Chemical Company); (b) vinyl polymers, such as (1) poly(vinyl alcohol) (such as Elvanol available from Dupont Chemical Company), (2) poly (vinyl phosphate) (such as #4391 available from Poly Sciences Inc.), (3) poly (vinyl pyrrolidone) (such as that available from GAF Corporation), (4) vinyl pyrrolidone-vinyl acetate copolymers (such as #02587, available from Poly Sciences Inc.), (5) vinyl pyrrolidone-styrene copolymers (such as #371, available from Scientific Polymer Products), (6) poly (vinylamine) (such as #1562, available from Poly Sciences Inc.), (7) poly (vinyl alcohol) alkoxylated, wherein alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl, and the like (such as poly (vinyl alcohol) ethoxylated #6573, available from Poly Sciences Inc.), and (8) poly (vinyl pyrrolidone-dialkylaminoalkyl alkylacrylate), wherein each alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl, and the like (such as poly (vinyl pyrrolidone-diethylaminomethylmethacrylate) #16294 and #16295, available from Poly Sciences Inc.); (c) formaldehyde resins, such as (1) melamine-formaldehyde resin (such as BC 309, available from British Industrial Plastics Limited), (2) urea-formaldehyde resin (such as BC777, available from British Industrial Plastics Limited), and (3) alkylated urea-formaldehyde resins, wherein alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl, and the like (such as methylated urea-formaldehyde resins, available from American Cyanamid Company as Beetle 65); (d) ionic polymers, such as (1) poly (2-acrylamide-2-methyl propane sulfonic acid) (such as #175 available from Scientific Polymer Products), (2) poly (N,N-dimethyl-3,5-dimethylene piperidinium chloride) (such as #401, available from Scientific Polymer Products), and (3) poly (methylene-guanidine) hydrochloride (such as #654, available from Scientific Polymer Products); (e) latex polymers, such as (1) cationic, anionic, and nonionic styrene-butadiene latexes (such as that available from Gen Corp Polymer Products, such as RES 4040 and RES 4100, available from Unocal Chemicals, and such as DL6672A, DL6638A, and DL6663A, available from Dow Chemical Company), (2) ethylene-vinylacetate latex (such as Airflex 400, available from Air Products and Chemicals Inc.), and (3) vinyl acetate-acrylic copolymer latexes (such as synthemul 97-726, available from Reichhold Chemical Inc, Resyn 25-1110 and Resyn 25-1140, available from National Starch Company, and RES 3103 available from Unocal Chemicals; (f) maleic anhydride and maleic acid containing polymers, such as (1) styrene-maleic anhydride copolymers (such as that available as Scripset from Monsanto, and the SMA series available from Arco), (2) vinyl alkyl ether-maleic anhydride copolymers, wherein alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl, and the like (such as vinyl methyl ether-maleic anhydride copolymer #173, available from Scientific Polymer Products), (3) alkylene-maleic anhydride copolymers, wherein alkylene has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl, and the like (such as ethylene-maleic anhydride copolymer #2308, available from Poly Sciences Inc., also available as EMA from Monsanto Chemical Company), (4) butadiene-maleic acid copolymers (such as #07787, available from Poly Sciences Inc.), (5) vinylalkylether-maleic acid copolymers, wherein alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl, and the like (such as vinylmethylether-maleic acid copolymer, available from GAF Corporation as Gantrez S-95), and (6) alkyl vinyl ether-maleic acid esters, wherein alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl, and the like (such as methyl vinyl ether-maleic acid ester #773, available from Scientific Polymer Products); (g) acrylamide containing polymers, such as (1) poly (acrylamide) (such as #02806, available from Poly Sciences Inc.), (2) acrylamide-acrylic acid copolymers (such as #04652, #02220, and #18545, available from Poly Sciences Inc.), and (3) poly (N,N-dimethyl acrylamide) (such as #004590, available from Poly Sciences Inc.); and (h) poly (alkylene imine) containing polymers, wherein alkylene has two (ethylene), three (propylene), or four (butylene) carbon atoms, such as (1) poly(ethylene imine) (such as #135, available from Scientific Polymer Products), (2) poly(ethylene imine) epichlorohydrin (such as #634, available from Scientific Polymer Products), and (3) alkoxylated poly (ethylene imine), wherein alkyl has one (methoxylated), two (ethoxylated), three (propoxylated), or four (butoxylated) carbon atoms (such as ethoxylated poly (ethylene imine #636, available from Scientific Polymer Products); and the like, as well as blends or mixtures of any of the above, with starches and latexes being particularly preferred because of their availability and applicability to paper. Any mixtures of the above ingredients in any relative amounts can be employed.

If present, the binder can be present within the coating in any effective amount; typically the binder and the ammonium compound are present in relative amounts of from about 10 percent by weight binder and about 90 percent by weight ammonium compound to about 50 percent by weight binder and about 50 percent by weight ammonium compound, although the relative amounts can be outside of this range.

In addition, the coating of the recording sheets of the present invention can contain optional filler components. Fillers can be present in any effective amount, and if present, typically are present in amounts of from about 1 to about 60 percent by weight of the coating composition. Examples of filler components include colloidal silicas, such as Syloid 74, available from Grace Company (preferably present, in one embodiment, in an amount of about 20 weight percent), titanium dioxide (available as Rutile or Anatase from NL Chem Canada, Inc.), hydrated alumina (Hydrad TMC-HBF, Hydrad TM-HBC, available from J. M. Huber Corporation), barium sulfate (K. C. Blanc Fix HD80, available from Kali Chemie Corporation), calcium carbonate (Microwhite Sylacauga Calcium Products), high brightness clays (such as Engelhard Paper Clays), calcium silicate (available from J. M. Huber Corporation), cellulosic materials insoluble in water or any organic solvents (such as those available from Scientific Polymer Products), blend of calcium fluoride and silica, such as Opalex-C available from Kemira.O.Y, zinc oxide, such as Zoco Fax 183, available from Zo Chem, blends of zinc sulfide with barium sulfate, such as Lithopane, available from Schteben Company, and the like, as well as mixtures thereof. Brightener fillers can enhance color mixing and assist in improving print-through in recording sheets of the present invention.

The coating containing the monoammonium compound is present on the substrate of the recording sheet of the present invention in any effective thickness. Typically, the total thickness of the coating layer is from about 0.5 to about 25 microns and preferably from about 1 to about 5 microns, although the thickness can be outside of these ranges.

The monoammonium compound or the mixture of monoammonium compound, optional binder, and/or optional filler can be applied to the substrate by any suitable technique, such as size press treatment, dip coating, reverse roll coating, extrusion coating, or the like. For example, the coating can be applied with a KRK size press (Kumagai Riki Kogyo Co., Ltd., Nerima, Tokyo, Japan) by dip coating and can be applied by solvent extrusion on a Faustel Coater. The KRK size press is a lab size press that simulates a commercial size press. This size press is normally sheet fed, whereas a commercial size press typically employs a continuous web. On the KRK size press, the substrate sheet is taped by one end to the carrier mechanism plate. The speed of the test and the roll pressures are set, and the coating solution is poured into the solution tank. A 4 liter stainless steel beaker is situated underneath for retaining the solution overflow. The coating solution is cycled once through the system (without moving the substrate sheet) to wet the surface of the rolls and then returned to the feed tank, where it is cycled a second time. While the rolls are being "wetted", the sheet is fed through the sizing rolls by pressing the carrier mechanism start button. The coated sheet is then removed from the carrier mechanism plate and is placed on a 12 inch by 40 inch sheet of 750 micron thick Teflon for support and is dried on the Dynamic Former drying drum and held under restraint to prevent shrinkage. The drying temperature is approximately 105° C. This method of coating treats both sides of the substrate simultaneously.

In dip coating, a web of the material to be coated is transported below the surface of the liquid coating composition by a single roll in such a manner that the exposed site is saturated, followed by removal of any excess coating by the squeeze rolls and drying at 100° C. in an air dryer. The liquid coating composition generally comprises the desired coating composition dissolved in a solvent such as water, methanol, or the like. The method of surface treating the substrate using a coater results in a continuous sheet of substrate with the coating material applied first to one side and then to the second side of this substrate. The substrate can also be coated by a slot extrusion process, wherein a flat die is situated with the die lips in close proximity to the web of substrate to be coated, resulting in a continuous film of the coating solution evenly distributed across one surface of the sheet, followed by drying in an air dryer at 100° C.

Recording sheets of the present invention can be employed in ink jet printing processes. One embodiment of the present invention is directed to a process which comprises applying an aqueous recording liquid to a recording sheet of the present invention in an imagewise pattern. Another embodiment of the present invention is directed to a printing process which comprises (1) incorporating into an ink jet printing apparatus containing an aqueous ink a recording sheet of the present invention, and (2) causing droplets of the ink to be ejected in an imagewise pattern onto the recording sheet, thereby generating images on the recording sheet. Ink jet printing processes are well known, and are described in, for example, U.S. Pat. No. 4,601,777, U.S. Pat. No. 4,251,824, U.S. Pat. No. 4,410,899, U.S. Pat. No. 4,412,224, and U.S. Pat. No. 4,532,530, the disclosures of each of which are totally incorporated herein by reference. In a particularly preferred embodiment, the printing apparatus employs a thermal ink jet process wherein the ink in the nozzles is selectively heated in an imagewise pattern, thereby causing droplets of the ink to be ejected in imagewise pattern.

The recording sheets of the present invention can also be used in any other printing or imaging process, such as printing with pen plotters, handwriting with ink pens, offset printing processes, or the like, provided that the ink employed to form the image is compatible with the ink receiving layer of the recording sheet.

Specific embodiments of the invention will now be described in detail. These examples are intended to be illustrative, and the invention is not limited to the materials, conditions, or process parameters set forth in these embodiments. All parts and percentages are by weight unless otherwise indicated.

The optical density measurements recited herein were obtained on a Pacific Spectrograph Color System. The system consists of two major components, an optical sensor and a data terminal. The optical sensor employs a 6 inch integrating sphere to provide diffuse illumination and 8 degrees viewing. This sensor can be used to measure both transmission and reflectance samples. When reflectance samples are measured, a specular component may be included. A high resolution, full dispersion, grating monochromator was used to scan the spectrum from 380 to 720 nanometers. The data terminal features a 12 inch CRT display, numerical keyboard for selection of operating parameters and the entry of tristimulus values, and an alphanumeric keyboard for entry of product standard information.

EXAMPLE I

Plain paper sheets (Simpson alkaline sized, carrying no surface treatments, obtained from Simpson Paper Co., Kalamazoo, Mich.) measuring 8.5×11 inches were treated with solutions comprising 2 percent by weight of a monoammonium compound and 98 percent of a solvent (specifically identified for each compound in the table below; etOH=ethanol; meOH=methanol; ratios are by weight) via dip coating and dried in air at room temperature. Subsequent to treatment, each paper sheet had deposited on each side thereof about 100 milligrams of the monoammonium compound. The treated papers, as well as sheets of the Simpson paper which had not been treated with a monoammonium compound, were incorporated into a Hewlett-Packard ® 500C ink jet printer, a Hewlett-Packard ® PaintJet ink jet printer, and a Xerox ® 4020 ink jet printer, and full color prints were generated on each sheet by each printer. The optical density of the cyan, magenta, yellow, and black were measured. Subsequently, the images were tested for water resistance by washing them at 50° C. for 2 minutes with water followed by again measuring the optical densities of the images. The results were as follows:

| | Black | | | Cyan | | | Magenta | | | Yellow | | |
|---|---|---|---|---|---|---|---|---|---|---|---|---|
| Cmpd. | Bef. | Aft. | % WF | Bef. | Aft. | % WF | Bef. | Aft. | % WF | Bef. | Aft. | % WF |
| none | 1.11 | 0.74 | 67 | 0.97 | 0.72 | 74 | 1.01 | 0.48 | 48 | 0.75 | 0.62 | 83 |
| 1 | 1.18 | 1.16 | 98 | 1.03 | 0.99 | 96 | 1.11 | 1.08 | 97 | 0.76 | 0.75 | 99 |
| 2 | 1.19 | 1.17 | 98 | 1.02 | 0.97 | 95 | 1.12 | 1.09 | 97 | 0.75 | 0.78 | 104 |
| 3 | 0.98 | 1.21 | 123 | 0.87 | 0.94 | 108 | 0.94 | 1.05 | 112 | 0.64 | 0.68 | 106 |
| 4 | 1.18 | 1.17 | 99 | 0.99 | 0.97 | 98 | 1.08 | 1.07 | 99 | 0.83 | 0.65 | 78 |
| 5 | 1.15 | 1.14 | 99 | 1.00 | 0.98 | 98 | 1.08 | 1.08 | 100 | 0.79 | 0.68 | 86 |
| 6 | 1.16 | 1.15 | 99 | 1.01 | 0.98 | 97 | 1.10 | 1.08 | 98 | 0.79 | 0.67 | 85 |
| 7 | 1.11 | 1.09 | 98 | 1.00 | 0.88 | 88 | 0.99 | 0.99 | 100 | 0.81 | 0.79 | 98 |
| 8 | 1.11 | 1.04 | 94 | 0.98 | 0.92 | 94 | 0.99 | 0.98 | 99 | 0.78 | 0.72 | 92 |
| 9 | 1.12 | 1.10 | 98 | 0.89 | 0.86 | 97 | 1.02 | 1.00 | 98 | 0.76 | 0.80 | 105 |
| 10 | 1.15 | 1.17 | 102 | 1.02 | 1.02 | 100 | 1.08 | 1.09 | 101 | 0.78 | 0.73 | 94 |
| 11 | 1.10 | 1.11 | 101 | 0.93 | 0.83 | 89 | 1.04 | 1.04 | 100 | 0.80 | 0.89 | 111 |
| 12 | 1.16 | 1.13 | 97 | 1.03 | 0.94 | 91 | 1.07 | 1.05 | 98 | 0.83 | 0.67 | 81 |
| 13 | 1.13 | 1.16 | 103 | 1.03 | 1.00 | 97 | 1.03 | 1.11 | 108 | 0.81 | 0.75 | 93 |
| 14 | 1.08 | 1.17 | 108 | 1.00 | 0.97 | 97 | 1.03 | 1.09 | 106 | 0.83 | 0.67 | 81 |
| 15 | 1.16 | 1.14 | 98 | 1.03 | 0.97 | 94 | 1.06 | 1.06 | 100 | 0.79 | 0.85 | 108 |
| 16 | 1.13 | 1.15 | 102 | 1.01 | 1.00 | 99 | 1.05 | 1.07 | 102 | 0.81 | 0.79 | 98 |
| 17 | 1.17 | 1.11 | 95 | 1.04 | 0.99 | 95 | 1.08 | 1.06 | 98 | 0.76 | 0.77 | 101 |
| optical density and waterfastness of coated papers printed with Xerox ® 4020 ink jet printer | | | | | | | | | | | | |
| none | 1.04 | 0.60 | 58 | 1.15 | 0.54 | 47 | 0.87 | 0.72 | 83 | 0.55 | 0.54 | 98 |
| 1 | 1.11 | 1.11 | 100 | 1.13 | 1.29 | 114 | 1.08 | 1.06 | 98 | 0.64 | 0.63 | 98 |
| 2 | 1.15 | 1.17 | 102 | 1.21 | 1.29 | 107 | 1.08 | 1.09 | 101 | 0.65 | 0.63 | 97 |
| 3 | 1.04 | 1.01 | 97 | 0.86 | 0.85 | 99 | 0.86 | 0.84 | 98 | 0.56 | 0.50 | 89 |
| 4 | 1.18 | 1.22 | 103 | 1.28 | 1.10 | 86 | 0.97 | 1.00 | 103 | 0.64 | 0.59 | 92 |
| 5 | 1.15 | 1.16 | 101 | 1.14 | 0.95 | 83 | 0.94 | 0.96 | 102 | 0.62 | 0.63 | 102 |
| 6 | 1.16 | 1.13 | 97 | 1.27 | 1.05 | 83 | 0.99 | 1.01 | 102 | 0.64 | 0.58 | 91 |
| 7 | 1.16 | 1.16 | 100 | 1.30 | 1.33 | 102 | 1.05 | 1.03 | 98 | 0.64 | 0.62 | 97 |
| 8 | 1.18 | 1.17 | 99 | 1.26 | 1.26 | 100 | 1.03 | 1.04 | 101 | 0.64 | 0.64 | 100 |
| 9 | 1.17 | 1.15 | 98 | 1.32 | 1.27 | 96 | 0.99 | 0.95 | 96 | 0.62 | 0.62 | 100 |
| 10 | 1.18 | 1.21 | 103 | 1.37 | 1.28 | 93 | 0.98 | 0.98 | 100 | 0.65 | 0.63 | 97 |
| 11 | 1.10 | 1.04 | 95 | 1.25 | 1.35 | 108 | 0.95 | 0.94 | 99 | 0.63 | 0.61 | 97 |
| 12 | 1.13 | 1.14 | 101 | 1.31 | 1.21 | 92 | 0.96 | 0.96 | 100 | 0.62 | 0.61 | 98 |
| 13 | 1.18 | 1.19 | 101 | 1.33 | 1.28 | 96 | 0.96 | 0.98 | 102 | 0.61 | 0.59 | 97 |
| 14 | 1.10 | 1.13 | 103 | 1.35 | 1.24 | 92 | 0.92 | 0.93 | 101 | 0.63 | 0.59 | 94 |
| 15 | 1.15 | 1.11 | 97 | 1.24 | 1.25 | 101 | 1.05 | 1.02 | 97 | 0.64 | 0.62 | 97 |
| 16 | 1.18 | 1.14 | 97 | 1.21 | 1.19 | 98 | 1.06 | 1.10 | 104 | 0.71 | 0.72 | 101 |
| 17 | 1.09 | 1.05 | 96 | 1.23 | 1.24 | 101 | 1.06 | 0.97 | 92 | 0.60 | 0.58 | 97 |
| optical density and waterfastness of coated papers printed with H-P | | | | | | | | | | | | |

-continued

| | Black | | | Cyan | | | Magenta | | | Yellow | | |
|---|---|---|---|---|---|---|---|---|---|---|---|---|
| Cmpd. | Bef. | Aft. | % WF | Bef. | Aft. | % WF | Bef. | Aft. | % WF | Bef. | Aft. | % WF |
| PaintJet ® ink jet printer | | | | | | | | | | | | |
| none | 0.80 | 0.49 | 61 | 1.10 | 0.45 | 41 | 0.90 | 0.19 | 21 | 0.74 | 0.48 | 65 |
| 5 | 0.88 | 0.83 | 94 | 1.22 | 1.12 | 92 | 0.98 | 0.87 | 89 | 0.78 | 0.74 | 95 |
| 18 | 0.92 | 0.92 | 100 | 1.18 | 1.07 | 91 | 0.92 | 0.85 | 92 | 0.77 | 0.67 | 87 |
| 6 | 0.95 | 1.07 | 113 | 1.17 | 0.94 | 80 | 0.91 | 0.65 | 71 | 0.74 | 0.58 | 78 |
| 19 | 1.00 | 0.96 | 96 | 1.25 | 1.20 | 96 | 0.97 | 0.86 | 89 | 0.86 | 0.82 | 95 |
| 20 | 0.87 | 0.90 | 103 | 1.09 | 1.06 | 97 | 0.83 | 0.72 | 87 | 0.68 | 0.74 | 109 |
| 16 | 0.92 | 1.06 | 109 | 1.13 | 1.08 | 96 | 0.87 | 0.86 | 99 | 0.76 | 0.76 | 100 |

optical density and waterfastness of coated papers printed with H-P 500C ink jet printer The monoammonium compounds in the above tables are as follows:

| # | Compound | Solvent |
|---|---|---|
| 1 | tetrahexyl ammonium chloride (Aldrich 26,383-4) | $H_2O$ |
| 2 | tetrahexyl ammonium bromide (Aldrich 25,281-6) | $H_2O$ |
| 3 | tetraheptyl ammonium bromide (Aldrich 23,784-1) | 80:20 $H_2O$/etOh |
| 4 | myristyl timethyl ammonium bromide (Aldrich 86,042-5) | $H_2O$ |
| 5 | tallow trimethyl ammonium chloride (Arquad T-50) | $H_2O$ |
| 6 | cetyl dimethyl ethyl ammonium bromide (Aldrich 22,899-0) | $H_2O$ |
| 7 | (-)-N-dodecyl-N-methyl-ephedrinium bromide (Aldrich 23,540-7) | 80:20 $H_2O$/etOH |
| 8 | domiphen bromide (Aldrich 24,748-0) | $H_2O$ |
| 9 | 3-chloro-2-hydroxypropyl N,N,N-dimethyl dodecyl ammonium chloride (Quab 342) | $H_2O$ |
| 10 | 3-chloro-2-hydroxypropyl N,N,N-dimethyl octadecyl ammonium chloride (Quab 426) | $H_2O$ |
| 11 | benzyl dimethyl dodecyl ammonium bromide (Aldrich 28,088-7) | $H_2O$ |
| 12 | benzyl dimethyl tetradecyl ammonium chloride (Aldrich 29,279-6) | $H_2O$ |
| 13 | benzyl cetyl dimethyl ammonium chloride (Aldrich 22,900-8) | 80:20 $H_2O$/meOH |
| 14 | benzyl dimethyl stearyl ammonium chloride (Aldrich 22,901-6) | $H_2O$ |
| 15 | didecyl dimethyl ammonium bromide (Aldrich 29,801-8) | $H_2O$ |
| 16 | mink amidopropyl.dimethyl-2-hydroxyethyl ammonium chloride (Ceraphyl 65) | $H_2O$ |
| 17 | tricapryl methyl ammonium chloride (Aliquat 336) | meOH |
| 18 | 1-propanaminium-2,3-dihydroxy-N-dimethyl-N-[3-[oxococoyl]aminopropyl chloride (Lexquat AMG-WC) | $H_2O$ |
| 19 | ocadecyl dimethyl benzyl ammonium chloride (Varisoft 6112) | $H_2O$ |
| 20 | didecyl dimethyl ammonium chloride (Bardac 2250, Lonza Inc.) | $H_2O$ |

As the data indicate, the sheets treated with the monoammonium compounds generally exhibited superior waterfastness compared to those sheets not treated with a monoammonium compound.

Other embodiments and modifications of the present invention may occur to those skilled in the art subsequent to a review of the information presented herein; these embodiments and modifications, as well as equivalents thereof, are also included within the scope of this invention.

What is claimed is:

1. A recording sheet which consists essentially of a substrate and, in contact with the substrate, a monoammonium compound of the formula:

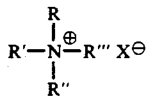

wherein R is an alkyl group, X is selected from the group consisting of fluoride, chloride, bromide, iodide, and astatide, and R', R'', and R''' are each independently selected from the group consisting of alkyl groups, substituted alkyl groups, aryl groups, substituted aryl groups, arylalkyl groups, and substituted arylalkyl groups; and mixtures thereof; an optional binder component; and an optional filler component.

2. A recording sheet according to claim 1 wherein the substrate is paper.

3. A recording sheet according to claim 1 wherein the substrate is transparent.

4. A recording sheet according to claim 1 wherein R', R'', and R''' are independently selected from the group consisting of alkyl groups with from 1 to about 25 carbon atoms, substituted alkyl groups with from 1 to about 25 carbon atoms, aryl groups with from 6 to about 25 carbon atoms, substituted aryl groups with from 6 to about 25 carbon atoms, arylalkyl groups with from 7 to about 25 carbon atoms, and substituted arylalkyl groups with from 7 to about 25 carbon atoms.

5. A recording sheet according to claim 1 wherein the substituents on the substituted R', R'', and R''' groups are independently selected from the group consisting of halogen atoms, amine groups, carboxylic acid groups, amide groups, hydroxy groups, nitro groups, ether and alkoxy groups, ester groups, silyl groups, aldehyde groups, and ketone groups.

6. A recording sheet according to claim 1 wherein the monoammonium compound is of the formula

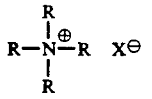
II wherein R is an alkyl group, X is selected from the group consisting of fluoride, chloride, bromide, iodide, and astatide, and all four R groups are the same.

7. A recording sheet according to claim 1 wherein the monoammonium compound is of the formula

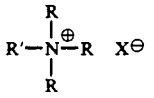
III wherein R is an alkyl group, X is selected from the group consisting of fluoride, chloride, bromide, iodide, and astatide, and R' is selected from the group consisting of alkyl groups, substituted alkyl groups, aryl groups, substituted aryl groups, arylalkyl groups, and substituted arylalkyl groups, wherein all three R groups are the same and R' is not the same as R.

8. A recording sheet according to claim 1 wherein the monoammonium compound is of the formula

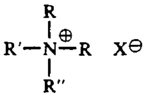
IV wherein R is an alkyl group, X is selected from the group consisting of fluoride, chloride, bromide, iodide, and astatide, R' and R" are each independently selected from the group consisting of alkyl groups, substituted alkyl groups, aryl groups, substituted aryl groups, arylalkyl groups, and substituted arylalkyl groups, wherein both R groups are the same, R' is not the same as R, and R" is not the same as R.

9. A recording sheet according to claim 1 wherein the monoammonium compound is selected from the group consisting of tetramethyl ammonium bromide, tetramethyl ammonium chloride, tetramethyl ammonium iodide, tetraethyl ammonium bromide, tetraethyl ammonium chloride, tetraethyl ammonium iodide, tetrapropyl ammonium bromide, tetrapropyl ammonium iodide, tetrabutyl ammonium bromide, tetrabutyl ammonium chloride, tetrabutyl ammonium iodide, tetrapentyl ammonium bromide, tetrapentyl ammonium chloride, tetrahexyl ammonium chloride, tetrahexyl ammonium bromide, tetrahexyl ammonium iodide, tetraheptyl ammonium bromide, tetraoctyl ammonium bromide, tetradecyl ammonium bromide, tetradodecyl ammonium bromide, tetrahexadecyl ammonium bromide, tetraoctadecyl ammonium bromide, 2-aminoethyl trimethyl ammonium chloride hydrochloride, 2-bromoethyl trimethyl ammonium bromide, 2-chloroethyl trimethyl ammonium chloride, 3-carboxypropyl trimethyl ammonium chloride, {3-(methacryloyl amino) propyl} trimethyl ammonium chloride, phenyl trimethyl ammonium bromide, phenyl trimethyl ammonium chloride, phenyl trimethyl ammonium iodide, benzyl trimethyl ammonium chloride, benzyl trimethyl ammonium bromide, 4-nitrobenzyl trimethyl ammonium chloride, {2-(4-nitrophenyl) allyl} trimethyl ammonium iodide, coco trimethyl ammonium chloride, palmityl trimethyl ammonium chloride, myristyl trimethyl ammonium bromide, oleyl trimethyl ammonium chloride, soya trimethyl ammonium chloride, tallow trimethyl ammonium chloride, hydrogenated tallow trimethyl ammonium chloride, stearyl trimethyl ammonium chloride, behenyl trimethyl ammonium chloride, guar hydroxypropyl trimethyl ammonium chloride, benzyl triethyl ammonium chloride, benzyl triethyl ammonium bromide, butyl tripropyl ammonium bromide, methyl tributyl ammonium chloride, methyl tributyl ammonium bromide, methyl tributyl ammonium iodide, benzyl tributyl ammonium chloride, benzyl tributyl ammonium bromide, benzyl tributyl ammonium iodide, heptyl tributyl ammonium bromide, N,N-dimethyl methylene ammonium chloride, N,N-dimethyl methylene ammonium iodide, chloromethylene dimethyl ammonium chloride, dichloromethylene dimethyl ammonium chloride, 1,5-dimethyl-1,5-diaza undecamethylene polymethobromide, dimethyl amino methylene amino methylene dimethyl ammonium chloride, benzethonium chloride, methyl benzethoniumchloride, 1-propanaminium 2,3-dihydroxy-N-dimethyl-N-{3(oxococoyl) amino} propyl}-chloride, cetyl dimethyl ethyl ammonium bromide, octyl dodecyl dimethyl ammonium chloride, dodecyl (2-hydroxy-1-methyl-2-phenyl-ethyl) dimethyl ammonium bromide, dodecyl dimethyl 2-phenoxyethyl ammonium bromide, dodecanoyl-N-methylamino ethyl-(phenyl carbamyl methyl) dimethyl ammonium chloride, 3-chloro-2-hydroxypropyl N,N,N-dimethyl dodecyl ammonium chloride, 3-chloro-2-hydroxypropyl N,N,N-dimethyl octadecyl ammonium chloride, dodecyl benzyl dimethyl ammonium bromide, dodecyl benzyl dimethyl ammonium chloride, coco benzyl dimethyl ammonium chloride, benzyl tetradecyl dimethyl ammonium chloride, benzyl cetyl dimethyl ammonium chloride, benzyl octadecyl dimethyl ammonium chloride, benzyl tallow dimethyl ammonium chloride, benzyl hydrogenated tallow dimethyl ammonium chloride, benzyl behenyl dimethyl ammonium chloride, dioctyl dimethyl ammonium chloride, didecyl dimethyl ammonium chloride, didecyl dimethyl ammonium bromide, dicoco dimethyl ammonium chloride, dicetyl dimethyl ammonium chloride, disoya dimethyl ammonium chloride, ditallow dimethyl ammonium chloride, dihydrogenated tallow dimethyl ammonium chloride, dibehenyl/diarachidyl dimethyl ammonium chloride, soya amido propyl benzyl dimethyl ammonium chloride, soya dicoco quaternary ammonium chloride, gluconamidopropyl dimethyl-2-hydroxyethyl ammonium chloride, N-alkyl-N-N-dimethyl-N(dodecyl acetate) ammonium chloride, wherein the alkyl has from 14 to 20 carbon atoms, mink amidopropyl dimethyl-2-hydroxyethyl ammonium chloride, N-rapeseed-(3-amidopropyl)-N-N-dimethyl-N-(2,3 epoxy propyl) ammonium chloride, N-stearyl-(3-amido propyl)-N-benzyl dimethyl ammonium chloride, rapeseed amido propyl benzyl dimethyl ammonium chloride, rapeseed amido propyl ethyl dimethyl ammonium chloride, cocamidopropyl polyethylene glycol dimethyl ammonium chloride phosphate, tricapryl methyl ammonium chloride, tridodecyl methyl ammonium chloride, tridecyloxypropyl dihydroxy ethyl methyl ammonium chloride, N-tetradecyl dimethyl-naphthyl methyl ammonium chloride, octadecyl diethanol methyl ammonium chloride, octadecyl dihydroxyethyl methyl ammonium chloride, dihydrogenated tallow benzyl methyl ammonium chloride, and mixtures thereof.

10. A recording sheet according to claim 1 wherein the monoammonium compound is present in an amount of from about 0.5 to about 25 percent by weight of the substrate.

11. A recording sheet according to claim 1 wherein the monoammonium compound is present in an amount of from about 2 to about 10 percent by weight of the substrate.

12. A recording sheet according to claim 1 wherein the monoammonium compound is present in an amount of from about 0.5 to about 25 grams per square meter of the substrate surface to which it is applied.

* * * * *